United States Patent
Yang et al.

(10) Patent No.: US 6,271,815 B1
(45) Date of Patent: Aug. 7, 2001

(54) HANDY INFORMATION DISPLAY SYSTEM (75) Inventors: Edward S. Yang, Menlo Park, CA (US); Yau-Yee Tam, Hong Kong (CN); Grantham Kwok-Hung Pang, Hong Kong (CN); Sing-Wai Cheung, Hong Kong (CN); Kai-Wing Tse, Hong Kong (CN); Paul Chi-Kong Kwok, Hong Kong (CN)

(73) Assignee: University of Hong Kong (CN)

( * ) Notice: Subject to any disclaimer, the term of this patent is extended or adjusted under 35 U.S.C. 154(b) by 0 days.

(21) Appl. No.: 09/251,526

(22) Filed: Feb. 17, 1999

Related U.S. Application Data (60) Provisional application No. 60/075,457, filed on Feb. 20, 1998.

(51) Int. Cl.[7] ..................................................... G09G 3/32
(52) U.S. Cl. .................................. 345/82; 345/83; 345/55; 345/56; 340/815.4; 340/815.45
(58) Field of Search ........................ 345/82, 83, 55, 345/56, 39, 44, 46; 348/801; 340/825.82, 815.4, 815.45

(56) References Cited

U.S. PATENT DOCUMENTS

| | | | |
|---|---|---|---|
| 4,330,870 | * | 5/1982 | Arends .................................. 455/617 |
| 4,409,467 | * | 10/1983 | Honjo .................................... 235/58 |
| 4,763,291 | * | 8/1988 | Schwaber .............................. 364/704 |
| 4,839,837 | * | 6/1989 | Chang .................................... 364/708 |
| 5,099,348 | * | 3/1992 | Huddleston et al. ................. 359/143 |
| 5,257,020 | * | 10/1993 | Morse ................................... 340/908 |
| 5,969,704 | * | 10/1999 | Green et al. ......................... 345/113 |
| 6,089,459 | * | 7/2000 | Eisele et al. ......................... 235/492 |

* cited by examiner

Primary Examiner—Bipin Shalwala
Assistant Examiner—Jimmy H. Nguyen
(74) Attorney, Agent, or Firm—Pennie & Edmonds LLP (57) ABSTRACT A handy information display system is disclosed. The system has three main components: a light emitting diodes (LED) array display board, an information server and a portable unit. The LED array display board includes a plurality of light emitting diodes and photodetectors. It can be used to display alphabets, numbers and simple graphics. While it visually gives an effectively stationary message display, the LED can also be modulated to transmit high frequency signals. The modulating frequency should be high enough to be imperceptible by humans. Both message display and signal transmission are controlled by an information server. The system further comprises at least one portable unit. The portable unit is equipped with an optical transceiver and a visual display unit. The optical transceiver can detect the signals transmitted from the LED array display board. The visual display unit then shows the information corresponding to the received signals.

29 Claims, 7 Drawing Sheets

HANDY INFORMATION DISPLAY SYSTEM

RELATED APPLICATION

The present application claims the priority of U.S. provisional patent application 60/075,457, entitled "Handy Information Display System", filed Feb. 20, 1998.

FIELD OF THE INVENTION

The present invention relates to a handy information display system. More particularly, the invention relates to a handy information display system of the type including a light emitting diode (LED) array display board that visually displays message and transmits signal to a portable unit at the same time.

BACKGROUND OF THE INVENTION

The present invention relates to the use and application in LED array display, optical communication and mobile computing. A review of these technologies are provided below as the background of the present invention.

LED array display board is a popular instrument for commercial usage. Many banks, shops and cinemas are willing to install one piece of it because of its versatility. LED array display board can be very bright and eye-catching. Thus, it is very suitable for advertising purpose. Also, unlike printed sign or logo, the message displayed on the LED array can be changed all the time. One can use it to tell people what is the most updated information in real-time. For example, in a bank, it is used to show the current stock market value, currency exchange rate and interests rate. In a shop, it can be used to tell people what is the opening hour, what is the biggest bargain today, etc.

The features and functionality of LED array display board also becomes more enriched. Scrolling, blinking, built-in character formats are just some basic functions. More powerful LED array can have a multi-color display. The resolution is enhanced by reducing the dot size and have LEDs packed more closely. The size of the array also becomes larger and larger. The smallest LED array starts with a single line text display. But some huge LED array can be taller than a man, have multi-line text and even graphics display. Nevertheless, existing LED display board is only used to give visual message (or image) display. It can do nothing more than this.

Free space optical communication (FSOC) is often used for short-range communication purpose. It is quite extensively used and popular, since the usage of optical frequency is not regulated by telecommunication authority. Some typical examples are TV remote control, toll collection, etc. A FSOC system mainly consists of a LED for transmitting light wave and a photodetector for converting an optical signal into an electrical signal. One may have other front-end circuit elements, such as optical filter, low noise amplifier, data and clock recovery circuit, etc.

An important point to note is that possible wavelengths used in optical communication ranges from the visible light region to the infrared region. However, most present FSOC systems use the infrared region. They are often referred to as infrared communication system. This may be due to the fact that those semiconductor devices (LED and photodetector) are more optimized in the infrared region. Nevertheless, visible light can also be a candidate for optical communication. Indeed, most LEDs do not emit light wave of a single wavelength.

The confluence of portable computers and wireless communication has led to the emergence of mobile computing. Mobile computing usually requires certain form of wireless network so that the mobile computer can get connected at pre-defined locations. Existing wireless network packages often utilize the atmospheric spectrum of ISM band or UHF band. Some uses the infrared spectrum.

Mobile computing is an attractive technology to most people who need to travel around and do not stay in a fixed office space. The potential user pool is very great. But some problems that hinder the growth of mobile computing include low communication bandwidth and high system cost. Existing wired network facilities also are not quite optimized for the purpose of mobile computing.

SUMMARY OF THE INVENTION

It is therefore an object of the present invention to provide a novel LED array display board with unconventional functionality.

It is an object of the present invention to use LED array display board as a communication device for displaying an image and transmitting information from one location to another location.

It is also object of the present invention to provide an information system for use in a wireless optical communication system.

It is also an object of the present invention to provide a FSOC system which utilizes both infrared and visible light wavelength regions.

It is yet another object of the present invention to give an alternative option to construct a mobile computing network.

The present invention is a handy information display system. The system comprises a LED array display board, an information server connected to the LED array display board and at least one portable unit. The LED array display board comprises a plurality of light emitting diodes and photodetectors. Each LED in the array can be individually controlled as to whether it illuminates or not. The LED array displays texts and simple graphics. While the LED array displays certain message visually, the illuminating LED can also be modulated, rather than constantly being turned on. Thus, the LED is turned on and off by a modulating signal. The modulating frequency should be high enough to be imperceptible by humans such that the LED array display appears to be constantly on and shows messages visually. But the light intensity emitted from the LED actually varies at a very fast pace. It's the human eye that is insensitive to these rapid changes. The whole LED array display board thus acts as a base station transmitter which transmits signals at an optical frequency.

The information server controls the operation of the LED array display board. It controls what text or graphics is displayed on the LED array and certain display features such as scrolling and blinking. The information server also controls transmission of signals to modulate the LEDs.

A portable unit receives and detects the optical signal emitted from the LED array display board. The signal received is then demodulated and decoded. The recovered information is then shown on a visual display unit, such as liquid crystal display (LCD).

For a more complete understanding of the invention, its objects and advantages, reference may be made to the following specification and to the accompanying drawings.

DETAILED DESCRIPTION OF THE INVENTION

A detailed description of preferred embodiments of the present invention is now provided in association with figures.

Figure 1:
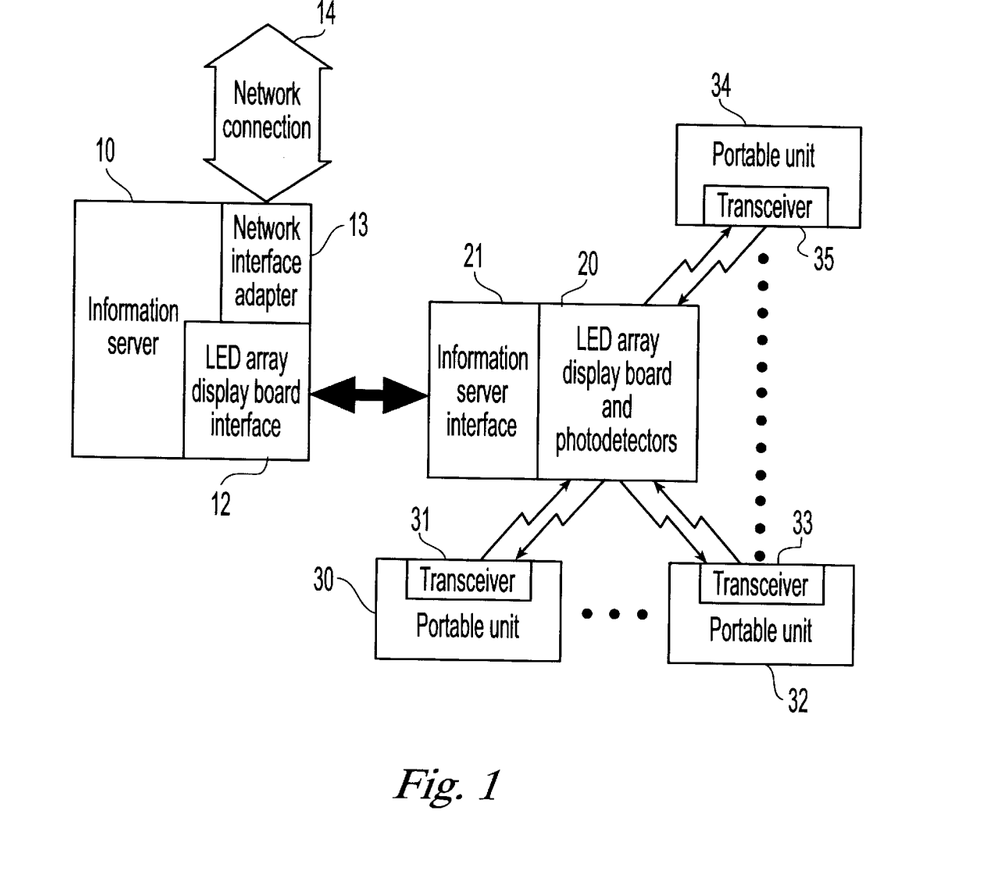
FIG. 1 is a block diagram of the handy information display system according to the present invention.

FIG. 1 is a block diagram of the handy information display system of the invention which comprises an information server 10, a LED array display board 20, and at least one portable unit as represented by numerals 30, 32, or 34. The information server 10 has two essential components. The first one is a LED array display board interface 12 through which the LED array display board 20 is controlled. The second essential component is a network interface adapter 13. This adapter enables the information server to get a network connection 14, such as Ethernet, which eventually connects to the Internet. The information server thus is capable of communicating with outside world to receive updated information literally from any places.

The information server exercises two control functions on the LED array display board. The first function is to control what appears on the display board, i.e., texts or graphics. The information server also provides the display board with certain display features, such as scrolling and blinking. The second function is to deliver to the LED array display board a modulating signal based on the information to be transmitted. This modulating signal is then used to modulate the LED array in the display board.

The LED array display board 20 is connected to the information server and includes a plurality of light emitting diodes and photodetectors. This allows a full-duplex communication link to be established between the LED array display board and the portable unit. The LED array display board includes an information server interface 21 which communicates with the information server.

A portable unit 30 (or 32, 34) is placed in front of the LED array display board to receive and detect an optical signal transmitted from the LED array. The portable unit is equipped with an optical transceiver such as numeral 31 (or 33, 35) so that it is capable of both receiving one optical signal from the LED array and transmitting another optical signal to the LED array.

Figure 2:
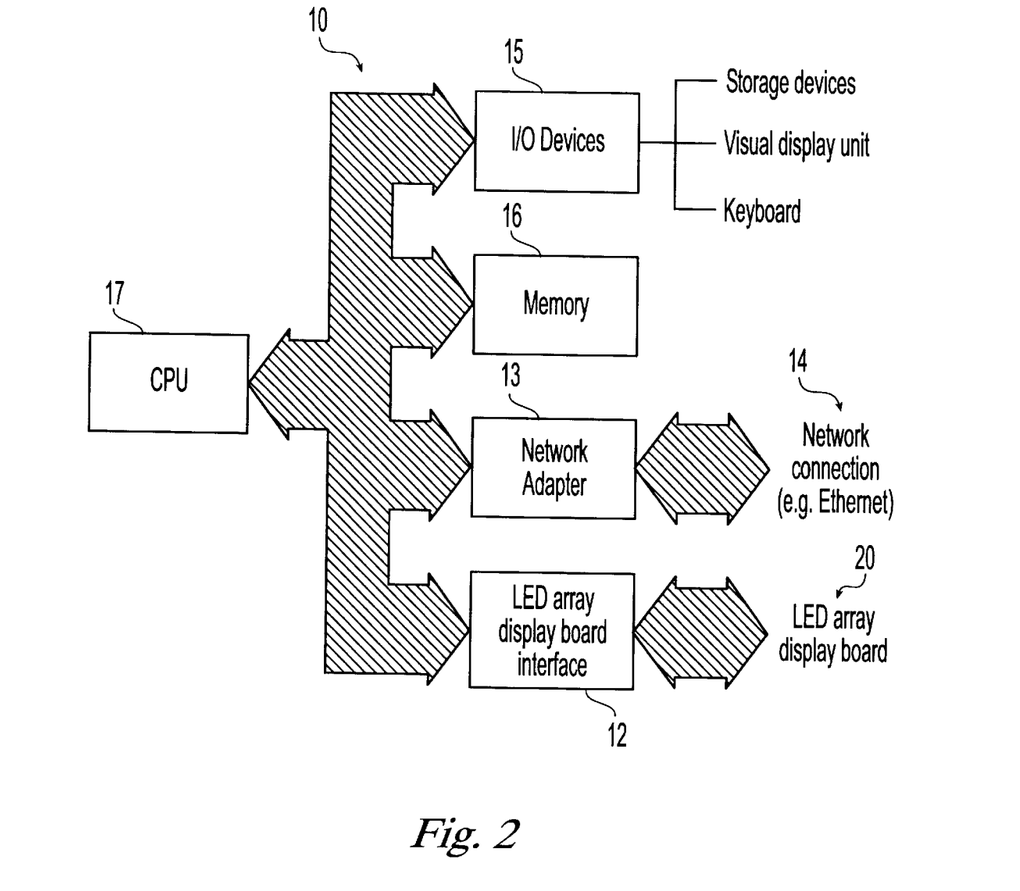
FIG. 2 is a functional block diagram of the information server.

FIG. 2 is a functional block diagram of the information server 10. The information server has a configuration similar to a computer. Indeed, a personal computer is a good choice for implementing the information server because of its low price and easy availability. The information server comprises a central processing unit (CPU) 17, a memory 16, I/O devices 15, a network adapter 13 and a LED array display board interface 12 as functionally connected in FIG. 2. An information server software is run on the information server to implement several functions of the server. It helps the user to build up the information database, manage the database and keep the database up-to-date by frequently retrieving information from the network through the LED array display board interface. The server software also formats texts and/or graphics to be displayed on the LED array. The user can key in the message or input a graphic image. This display data is then fed to the LED array display board, and a corresponding pattern is then shown on the LED array.

The most important function of the server software is to process the information to be transmitted by the LED array and the information received from the portable unit. Information is retrieved from the database and put into a transmit buffer of the LED array display board interface while the received data temporarily held in a receive buffer is processed.

The CPU and the memory are important components because the workload of the information server is quite heavy. It is preferred to have a CPU of high performance. The memory requirement is not critical since the server software is not memory-intensive. The memory is mainly used for running the server software and caching data in the information database.

The information server 10 has several I/O devices: a visual display unit, a keyboard and storage devices. The storage devices are hard disk, CD-ROM drive and tape drive. It is important to have a large hard disk to hold the vast amount of real-time information in the database. The CD-ROM drive can also be used to store the database if the information is relatively permanent and not to be changed often. The tape drive is used for backup purpose.

The network adapter 13 is essential in the information server because it allows the server to connect to the outside world. The network adapter connects to a local area network (LAN) 14, such as Ethernet. The local area network 14 in turn has a connection point to the Internet.

Figure 3:
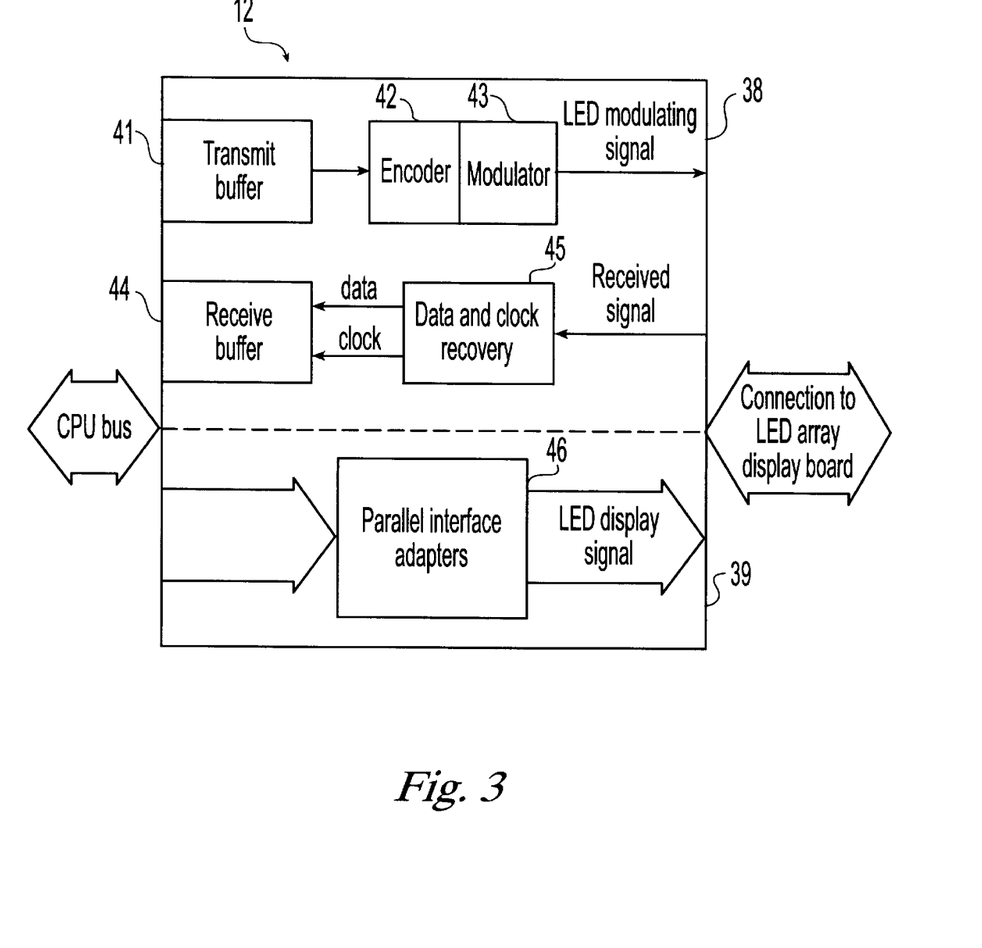
FIG. 3 is a functional block diagram of the LED array display board interface.

The LED array display board interface 12 serves as a communication link between the information server and the LED array display board. FIG. 3 is a functional block diagram of the LED array display board interface. This interface can be implemented as an expansion card inserted into an expansion slot of the computer's motherboard. The LED array display board interface 12 comprises an upper block 38 and a lower block 39, as shown in the figure. The upper block is an optical transceiver back-end which has a transmitter part and a receiver part. The lower block 39 is a parallel interface means used for controlling the display pattern of the LED array.

In the transmitter part of the optical transceiver 38, a transmit buffer 41 is used to temporarily store the information to be transmitted. This transmit buffer allows a certain degree of asynchronization between the time the information is put into the buffer 41 and the time it is sent out. The information, in the form of data bytes, is then transformed into serial bit stream as it comes out of the transmit buffer 41. The bit stream is encoded and modulated. Encoding is carried out at an encoder 42 to provide encryption for security purpose. Modulation is done at a modulator 43 to generate an optical pulse format suitable for free space communication purpose. The modulated optical signal has a constant average intensity. That is, the average light intensity from each LED does not vary over a period of time. The LED thus seems to be constantly turned on all the time as viewed by humans. The output of the modulator 43 is then fed to the LED array to modulate LEDs.

In the receiver part of the optical transceiver, a data and clock recovery circuit 45 is used. This circuit 45 takes a received signal from the LED array display board 20 in the form of data bit stream and reconstructs it to a proper digital signal level (for example, TTL level). A clock signal is also generated corresponding to the data rate. A receive buffer 44 is then used to temporarily store the recovered data before they are processed by the server software.

The lower block of the interface 39 is used for interfacing with the display control module of the LED array display board. It has a parallel interface adapter (PIA) 46 which is used as a latch. More PIA can be added to provide more output ports. The light emitting diodes to be turned on in the LED array are latched through the PIA to the LED array display board 20.

Figure 4:
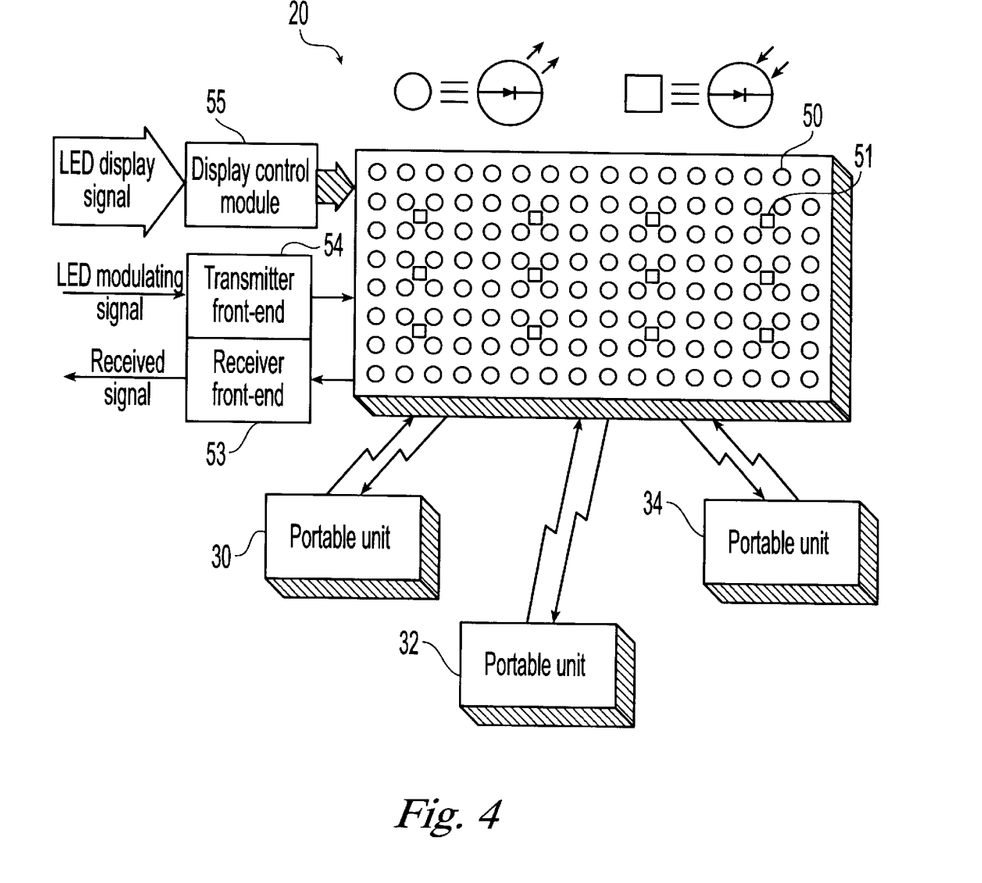
FIG. 4 is a functional block diagram of the LED array display board with some portable units around.

FIG. 4 shows a block diagram of the LED array display board 20 with portable units 30, 32, and 34. The LED array display board comprises a LED array 50 with embedded photodetectors 51, an optical base station transceiver front-end having a receiver front-end 53 and a transmitter front-end 54, and a display control module 55.

The LED array 50 comprises a plurality of light emitting diodes. Embedded in this LED array are a number of photodetectors 51. These components are the primary elements of the base station optical transceiver. The base station optical transceiver front-end has circuits interfaced to the LED array and the photodetectors. These circuits process signals to be transmitted by the LED array and/or signals received by the photodetectors. The operation and function of the circuits will be discussed in more details later.

The display control module 55 is used to format display patterns on the LED array. Display data are obtained from the information server. These data contain the display pattern of which LED in the array 50 should illuminate. This display signal is superimposed with the modulating signal and then fed to the LED array 50.

Figure 5:
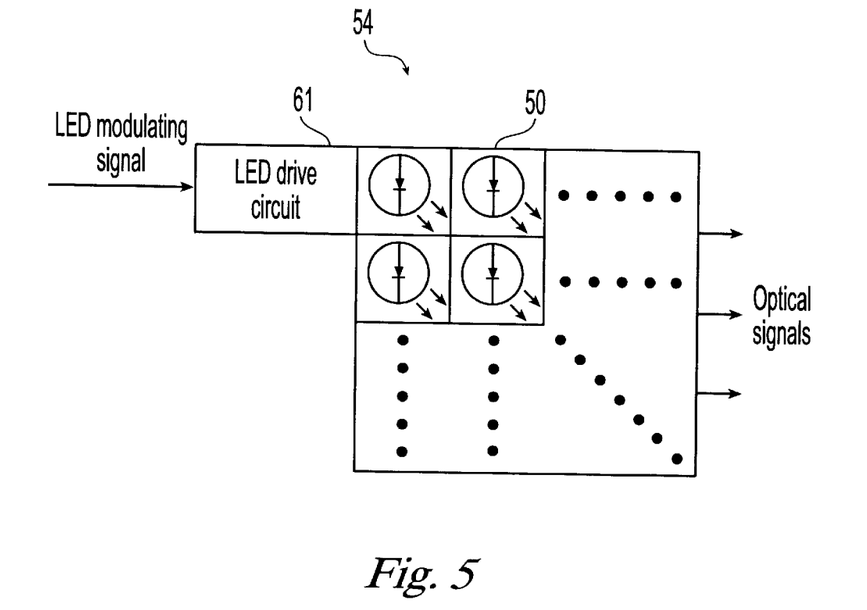
FIG. 5 is a schematic block diagram of the base station transmitter front-end.

FIG. 5 is a schematic block diagram of a base station optical transmitter front-end 54. The optical transmitter front-end comprises a LED drive circuit 61. The LED modulating signal output from the information server is fed to the LED drive circuit 61 which in term generates a suitable current to modulate the LED array 50 so that the produced light intensity of the optical signal varies at a high enough frequency that is imperceptible to the human eye.

Figure 6:
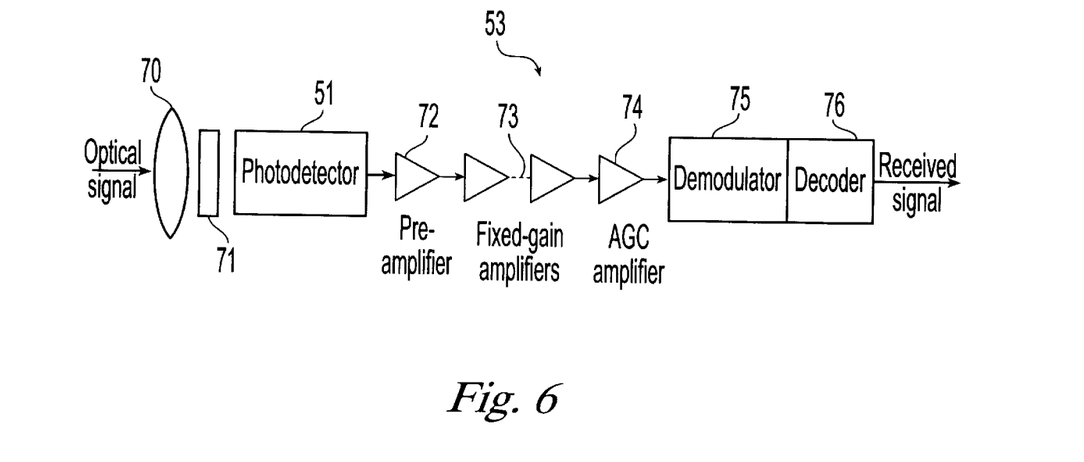
FIG. 6 is a schematic block diagram of the base station receiver front-end.

FIG. 6 is a schematic block diagram of the base station optical receiver front-end 53. At the front, a convex lens 70 focuses an optical signal in the form of incident light rays so that more optical power is received by the photodetector 51. An optical filter 71 may be inserted between the lens 70 and the photodetector 51 to filter out the light wave of which the wavelength is out of range. For example, if the base station receiver is to receive red light from the portable unit, an optical filter 71 is used to filter out any yellow light, green light, or blue light, etc. to minimize interference. The photodetector 51 converts the optical signal into an electrical signal. This signal is then amplified with a series of amplifiers. These include a low noise pre-amplifier 72, a fixed-gain amplifier 73, and an automatic gain control (AGC) amplifier 74 arranged in this order. After the electrical signal is amplified to a suitable level, it is output to a demodulator 75 and a decoder 76 subsequently to recover the original bit stream.

Figure 7:
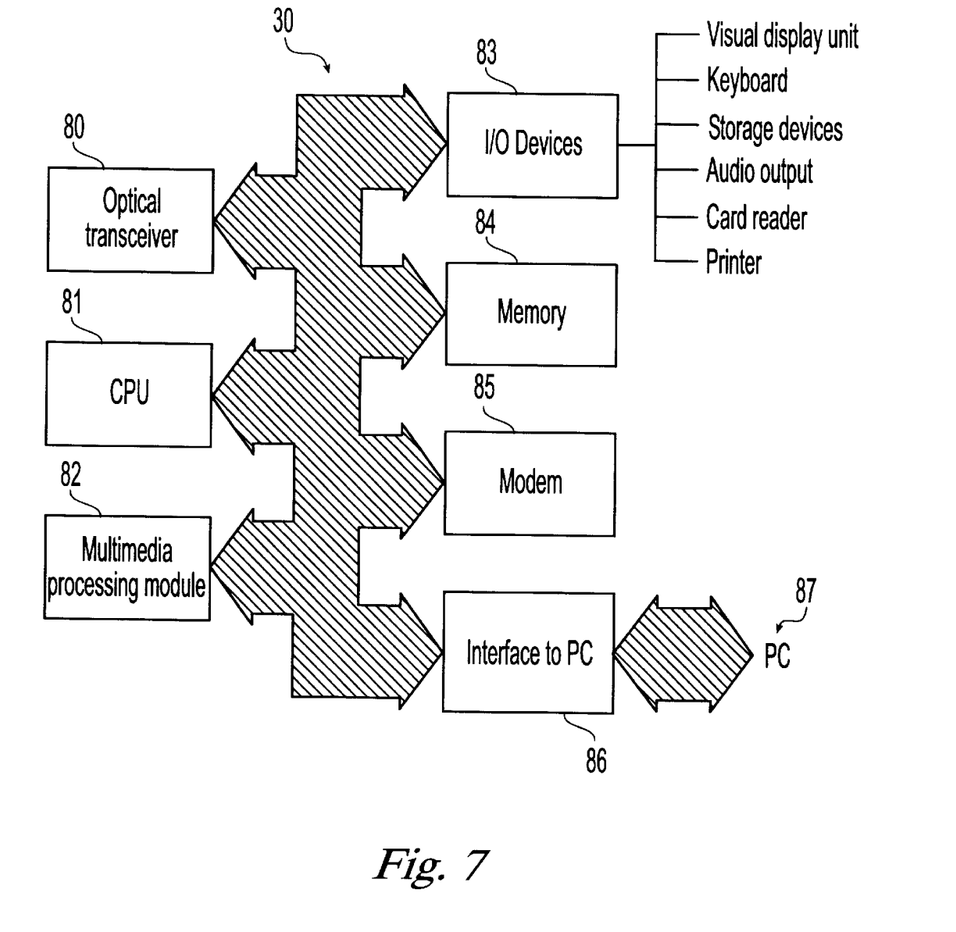
FIG. 7 is a functional block diagram of the portable unit.

FIG. 7 is a functional block diagram of a portable unit 30. The portable unit includes an optical transceiver 80, a CPU 81, a multimedia processing module 82, I/O devices 83, a memory 84, a modem 85 and an interface to PC 86 functionally connected as shown in the figure.

Figure 8:
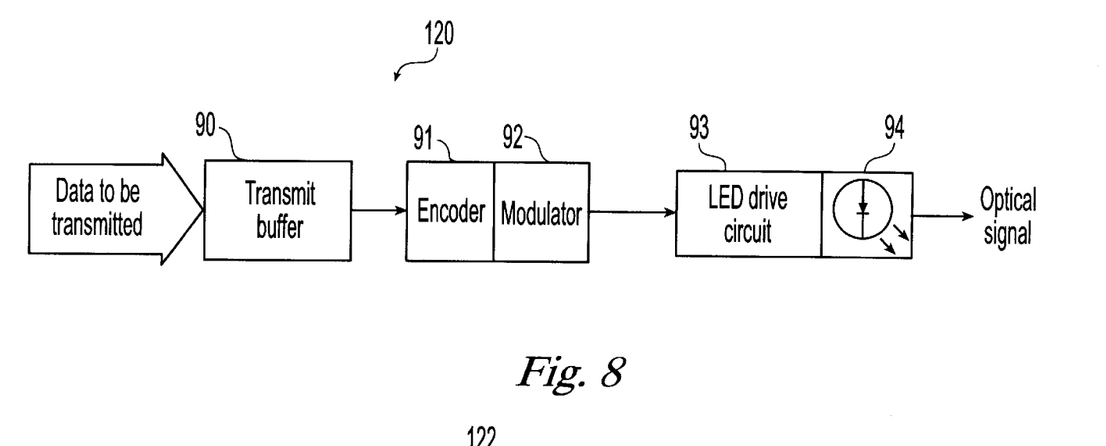
FIG. 8 is a schematic block diagram of the optical transmitter of the portable unit.
Figure 9:
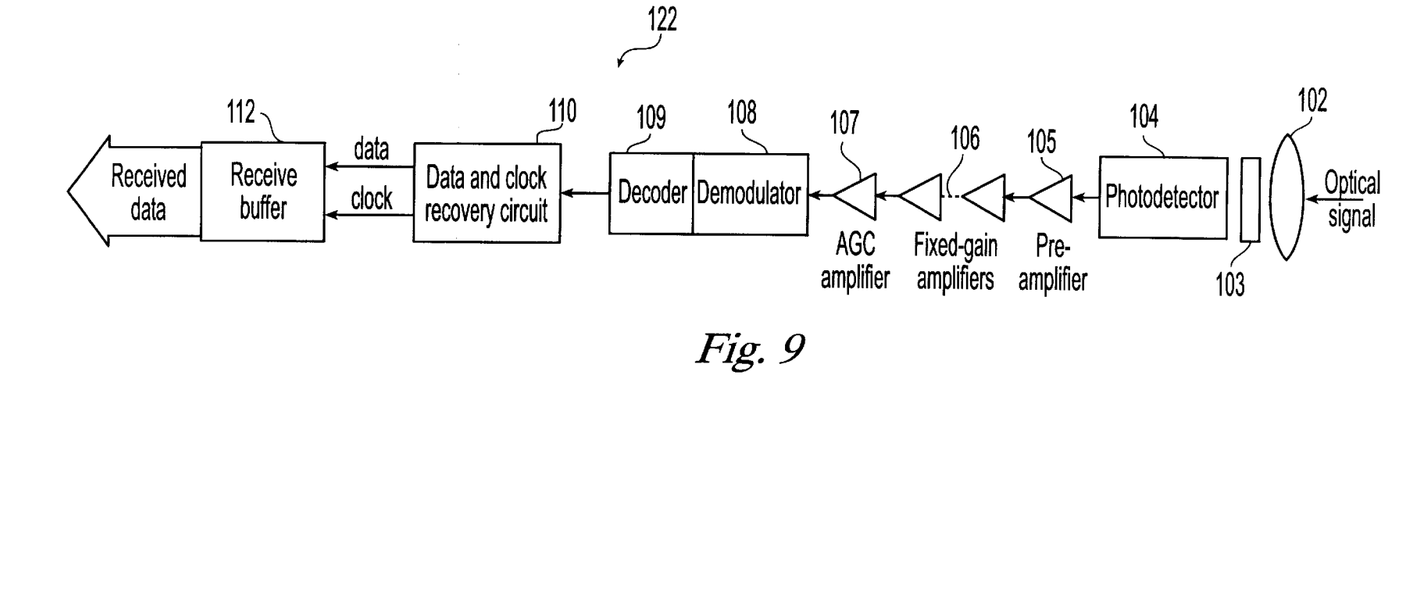
FIG. 9 is a schematic block diagram of the optical receiver of the portable unit.

The optical transceiver 80 has an optical transmitter and an optical receiver. FIGS. 8 and 9 are schematic block diagrams of the optical transmitter 120 and the optical receiver 122 respectively. The optical transmitter 120 has a transmit buffer 90, an encoder 91, a modulator 92 and a LED drive circuit 93 connected in series. An LED 94 is connected to the LED drive circuit and modulated to transmit an optical signal to the LED array display board 20. The optical receiver 122 comprises a convex lens 102, an optical filter 103, a photodetector 104, a series of amplifiers 105, 106, and 107, a demodulator 108, a decoder 109, a data and clock recovery circuit 110 and a receive buffer 112. This optical receiver detects and recovers the optical signal transmitted from the LED array 50. The operation and function of each element in the optical receiver is similar to those in the LED array display board.

In a full-duplex communication link, it is important to note which wavelength region is used for the two communication paths. If the same wavelength is used for both paths, the interference will be quite significant. It is recommended to use different wavelengths for the two links. For example, if the LED array 50 emits yellow light, optical filter 103 in the portable unit will filter out light of other wavelengths except for the yellow light. The portable unit 30 then uses light of other colors for transmission, such as red light or blue light, etc. Infrared is also possible because there is no need for the transmitted ray to be visible. A suitable optical filter 71 in the base station receiver 53 is used to filter out unwanted signals.

The central processing unit 81 is the heart of the portable unit. This CPU is actually a microcontroller which features low power consumption. This helps to extend the battery life of the portable unit. The CPU performance is not as critical as that in the information server because the CPU handles only data of its own unit whereas the information server needs to handle data from any portable units. Nevertheless, the CPU should be fast enough to be able to handle both the incoming and outgoing bit streams.

The multimedia processing module 82 is a coprocessor that helps the CPU 81 to handle multimedia processes. This module provides two multimedia processing functions: video processing and audio processing. The video processing module is used to decode compressed video data to recover the motion picture whereas while the audio processing module is used to decode compressed audio data. A speech synthesizer is also included to generate human speech based on text message. Note however that the multimedia processing module is optional because some applications do not require multimedia.

The memory 84 used in the portable unit includes volatile random access memory (RAM) and nonvolatile flash memory. The RAM is used for temporary storage of data and program variables. The nonvolatile memory is used to store relatively permanent data and software program. The usage of flash memory is very desirable because of its nonvolatility and low power consumption. The data density is also very high. These properties are advantageous for the design of the portable unit.

The I/O devices 83 of the portable unit include a visual display unit, a keyboard, a card reader and a printer. In this invention, a liquid crystal display (LCD) is used as the visual display unit. If the portable unit is mainly used for video vision, a color LCD may be used. The card reader is capable of reading data from a card with magnetic tape. The purpose of including the card reader is to facilitate certain security transactions. For example, when the user is doing money transactions or purchasing, a key card is necessary to access these functions. The printer included then gives a receipt on that transaction. This printer is small size and detachable, so that it only needs to be connected when in use.

The PC interface 86 is included in the portable unit. This PC interface facilitates the user to exchange information between the portable unit 30 and a PC 87 at his home.

The modem 85 may also be included if the user wants to use telephone line for network connection.

The handy information display system can operate in two modes: broadcasting mode and full-duplex mode. In broadcasting mode, the LED array broadcasts information to a number of portable units. All portable units receive the same information contents. This is a simplex communication link.

A full-duplex communication link is established when the portable unit incorporates an optical transmitter, the LED array display board incorporates an optical receiver, and communication can go in the opposite direction. Instead of broadcasting, the communication protocol now becomes a bi-directional multiple access protocol, such as time division multiple access (TDMA), code division multiple access (CDMA), etc.

The invention can find a lot of applications in real life. For example, in a bank, a LED array display board is installed to inform people about the current stock market index. But it is impossible to show all individual stocks values due to the limited size of the display board. A portable unit is then used to receive these extra information. The user can selectively retrieve the information they want. It is also possible to use the system to handle transaction. For example, the user can use the portable unit to key in what stocks he wants to buy or sell.

Another example is tourism information kiosk. A LED array display board is installed in certain places like railway station, airport or some main streets. The tourist, with a portable unit, can retrieve travel information, such as what sightseeing places to go, how to get there, etc.

Another example is daily newspaper server on a train. A LED array display board is installed inside the train. News headlines will be shown on the display board. Passengers with the portable units can retrieve the details of the news contents. They can select among the front page, financial news, sports news or cartoons.

After all, the present invention gives a novel kind of mobile computing. The LED array display board serves as a base station transceiver. It gives network connection to portable or handheld computers.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A handy information display system comprising:
   a light emitting diode array display board for displaying a visual signal, transmitting a first optical signal and receiving a second optical signal;
   an information server connected to said light emitting diode array display board for controlling operation of said light emitting diode array display board; said information server comprising:
   a network interface adapter for connecting said information server to a network; and
   a light emitting diode array display board interface for communicating information of said first and second optical signals between said information server with said light emitting diode array display board; and
   at least one portable unit for receiving said first optical signal from said light emitting diode array display board and transmitting said second optical signal to said light emitting diode array display board.

2. The handy information display system according to claim 1, wherein said information server further comprises:
   one central processing unit interactive with said network interface adapter and said light emitting diode array display board interface;
   a predetermined amount of memory connected to said central processing unit; and
   input and output devices connected to said central processing unit.

3. The handy information display system according to claim 2, wherein said input and output devices comprises a hard disk, a CD-ROM drive, a tape unit, a keyboard and a monitor.

4. The handy information display system according to claim 1, wherein said light emitting diode array display board interface comprises:
   an optical transceiver back-end for communicating information of said first and second optical signals between said light emitting diode array display board and said information server; and
   a parallel interface means for latching data of said visual signal to said light emitting diode array display board.

5. The handy information display system according to claim 4, wherein said optical transceiver back-end comprises:
   an encoder for encrypting said information of said first optical signal;
   a modulator connected to said encoder for transforming said information of said first optical signal into optical pulses to modulate said light emitting diodes in said light emitting diode array display board;
   a data recovery means for reconstructing said second optical signal received by said LED array display board into a digital signal; and
   a clock recovery means for recovering a clock signal according to a data rate.

6. The handy information display system according to claim 5, wherein said optical transceiver back-end further comprises:
   a transmit buffer connected to said encoder for transforming said information of said first optical signal into a serial bit stream before encrypting; and
   a receive buffer for temporarily storing said information of said second optical signal and said clock signal.

7. The handy information display system according to claim 6, wherein said information server further comprises a software program for implementing functions of:
   assisting a build-up of an information database in said transmit buffer and said receive buffer;
   managing said information database;
   retrieving information from the network to keep the information database up-to-date;

formatting visual display pattern for the light emitting diode array display board;

processing the information of said first optical signal; and processing the information of said second optical signal.

8. The handy information display system according to claim 1, wherein said light emitting diode array display board comprises:

a plurality of light emitting diodes for displaying said visual signal and transmitting said first optical signal;

a plurality of photodetectors for converting said second optical signal transmitted by said portable unit into an electrical signal;

an optical transmitter front-end connected to said light emitting diodes for processing said first optical signal before being transmitted by said light emitting diodes;

an optical receiver front-end connected to said photodetectors for processing said second optical signal received by said photodetectors; and a display control means for controlling operation of said light emitting diode array display board for displaying said visual signal.

9. The handy information display system according to claim 8, wherein said optical transmitter front-end comprises a LED drive circuit for controlling the light intensity emitted from each of said light emitting diodes.

10. The handy information display system according to claim 8, wherein said optical receiver front-end comprises:

a lens for focusing light rays of said second optical signal on said photodetector;

an optical filter located after said lens for filtering out unwanted light rays;

a preamplifier located after said photodetector for first amplification of said electrical signal generated by said photodetector;

a fixed-gain amplifier connected to said preamplifier for second amplification of said electrical signal;

an automatic gain control amplifier connected to said fixed-gain amplifier for third amplification of said electrical signal to a predetermined electrical signal level;

a demodulator connected to said automatic gain control amplifier for demodulating said electrical signal; and a decoder connected to said demodulator for decrypting said electrical signal.

11. The handy information display system according to claim 2, wherein said portable unit comprises:

an optical transmitter for transmitting said second optical signal to said light emitting diode array display board; and an optical receiver for receiving said first optical signal from said LED array display board.

12. The handy information display system according to claim 11, wherein said portable unit further comprises:

one central processing unit interactive with said optical transmitter and said optical receiver;

a predetermined amount of memory for said central processing unit;

input and output devices; and a personal computer interface between said portable unit and a personal computer.

13. The handy information display system according to claim 12, wherein said portable unit further comprises a multimedia processing module connected to said central processing unit for processing multimedia data.

14. The handy information display system according to claim 13, wherein said portable unit further comprises a modem connected to said central processing unit.

15. The handy information display system according to claim 12, wherein said input and output devices comprise a visual display unit, a keyboard, a card reader and a printer.

16. The handy information display system according to claim 11, wherein said optical transmitter comprises:

at least one light emitting diode for transmitting said second optical signal;

an encoder for encrypting information of said second optical signal;

a modulator connected to said encoder for transforming said information of said second optical signal into optical pulses to modulate said light emitting diode; and a LED drive circuit for driving said light emitting diode.

17. The handy information display system according to claim 16, wherein said optical transmitter further comprises a transmit buffer connected to said encoder for transforming said information of said first optical signal into a serial bit stream before encrypting.

18. The handy information display system according to claim 11, wherein said optical receiver comprises:

a photodetector;

a lens for focusing light rays of said first optical signal on said photodetector;

an optical filter located after said lens for filtering out unwanted light rays;

a preamplifier located after said photodetector for first amplification of an electrical signal generated by said photodetector;

a fixed-gain amplifier connected to said preamplifier for second amplification of said electrical signal;

an automatic gain control amplifier connected to said fixed-gain amplifier for third amplification of said electrical signal to a predetermined electrical signal level;

a demodulator connected to said automatic gain control amplifier for demodulating said electrical signal;

a decoder connected to said demodulator for decrypting said electrical signal;

a data recovery means for reconstructing said electrical signal into a digital signal; and a clock recovery means for recovering a clock signal according to a data rate.

19. The handy information display system according to claim 18, wherein said optical receiver further comprises a receive buffer for temporarily storing said digital signal and said clock signal.

20. The handy information display system according to claim 13, wherein said multimedia processing module comprises:

a video processing means for manipulating video data;

an audio processing means for manipulating audio data; and a speech synthesizer for generating human speech from text messages.

21. A handy information display system comprising:

a light emitting diode array display board for displaying a visual signal and transmitting an optical signal;

an information server connected to said light emitting diode array display board for controlling operation of said light emitting diode array display board; said information server comprising:

a network interface adapter for connecting said information server to a network; and a light emitting diode array display board interface for communicating information of said optical signal between said information server with said light emitting diode array display board; and at least one portable unit for receiving said optical signal from said light emitting diode array display board.

22. The handy information display system according to claim 21, wherein said information serve further comprises:

one central processing unit interactive with said network interface adapter and said light emitting diode array display board interface;

a predetermined amount of memory connected to said central processing unit; and input and output devices connected to said central processing unit.

23. The handy information display system according to claim 22, wherein said input and output devices comprises a hard disk, a CD-ROM drive, a tape unit, a keyboard and a monitor.

24. The handy information display system according to claim 21, wherein said light emitting diode array display board interface comprises:

an optical transmitter back-end for communicating information of said optical signal between said light emitting diode array display board and said information server; and a parallel interface means for latching data of said visual signal to said light emitting diode array display board.

25. The handy information display system according to claim 24, wherein said optical transmitter back-end comprises:

a transmit buffer for transforming said information of said optical signal into a serial bit stream;

an encoder connected to said transmitter buffer for encrypting said information of said first optical signal; and a modulator connected to said encoder for transforming said information of said first optical signal into optical pulses to modulate said light emitting diodes in said light emitting diode array display board.

26. The handy information display system according to claim 25, wherein said information server further comprises a software program for implementing functions of:

assisting a build-up of an information database in said transmit buffer;

managing said information database;

retrieving information from the network to keep the information database up-to-date;

formatting visual display pattern for the light emitting diode array display board; and processing the information of said optical signal.

27. The handy information display system according to claim 21, wherein said light emitting diode array display board comprises:

a plurality of light emitting diodes for displaying said visual signal and transmitting said optical signal;

an optical transmitter front-end connected to said light emitting diodes for processing said optical signal before being transmitted by said light emitting diodes; and a display control means for controlling operation of said light emitting diode array display board for displaying said visual signal.

28. The handy information display system according to claim 27, wherein said optical transmitter front-end comprises a LED drive circuit for controlling the light intensity emitted from each of said light emitting diodes.

29. The handy information display system according to claim 21, wherein said portable unit comprises an optical receiver for receiving said optical signal from said LED array display board, and said optical receiver comprises:

a photodetector;

a lens for focusing light rays of said first optical signal on said photodetector;

an optical filter located after said lens for filtering out unwanted light rays;

a preamplifier located after said photodetector for first amplification of an electrical signal generated by said photodetector;

a fixed-gain amplifier connected to said preamplifier for second amplification of said electrical signal;

an automatic gain control amplifier connected to said fixed-gain amplifier for third amplification of said electrical signal to a predetermined electrical signal level;

a demodulator connected to said automatic gain control amplifier for demodulating said electrical signal;

a decoder connected to said demodulator for decrypting said electrical signal;

a data recovery means for reconstructing said electrical signal into a digital signal;

a clock recovery means for recovering a clock signal according to a data rate; and a receive buffer for temporarily storing said digital signal and said clock signal.

* * * * *